US012691999B2

(12) United States Patent
Chambers

(10) Patent No.: US 12,691,999 B2
(45) Date of Patent: Jul. 28, 2026

(54) GYROSCOPICALLY STABILISED FIREFIGHTING AERIAL VEHICLES

(71) Applicant: ZIRCON CHAMBERS PTY. LTD., Queensland (AU)

(72) Inventor: Christopher Malcolm Chambers, Queensland (AU)

(73) Assignee: Zircon Chambers Pty. Ltd., Manunda Cairns (AU)

( * ) Notice: Subject to any disclaimer, the term of this patent is extended or adjusted under 35 U.S.C. 154(b) by 0 days.

(21) Appl. No.: 17/424,630

(22) PCT Filed: Jan. 23, 2020

(86) PCT No.: PCT/AU2020/050038
§ 371 (c)(1),
(2) Date: Jul. 21, 2021

(87) PCT Pub. No.: WO2020/150778
PCT Pub. Date: Jul. 30, 2020

(65) Prior Publication Data
US 2022/0089276 A1      Mar. 24, 2022

(30) Foreign Application Priority Data

Jan. 23, 2019      (AU) ................................ 2019900211

(51) Int. Cl.
*B64C 17/06*          (2006.01)
*A62C 3/02*          (2006.01)
(Continued)

(52) U.S. Cl.
CPC ............ *B64C 29/04* (2013.01); *A62C 3/0207* (2013.01); *A62C 3/0242* (2013.01); *B64C 17/06* (2013.01);
(Continued)

(58) Field of Classification Search
CPC ......... B64C 17/06; B64C 29/04; B64C 29/02; B64D 1/16; B64D 27/20; A62C 3/0207; A62C 3/0242
See application file for complete search history.

(56) References Cited

U.S. PATENT DOCUMENTS 2,952,422 A *  9/1960  Fletcher .................. B64C 29/02
                                                                          D12/325
3,199,809 A      8/1965  Modesti
                            (Continued)

FOREIGN PATENT DOCUMENTS

KR        20120038713 A      4/2012

OTHER PUBLICATIONS

International Search Report and Written Opinion dated May 4, 2020 for corresponding International Application No. PCT/AU2020/050038.

*Primary Examiner* — Philip J Bonzell
(74) *Attorney, Agent, or Firm* — Polson Intellectual Property Law P.C.; Margaret Polson; Christopher Sylvain

(57) ABSTRACT

Various forms of a gyroscopically stabilised aerial vehicle are provided. The aerial vehicle comprises a jet turbine and or an electric motor coupled to a gyroscopic stabilisation assembly via a shaft assembly. In preferred embodiments the gyroscopic stabilisation assembly comprises a gyroscopic fan with alternating pivoting fan blades to provide controlled stable flight. The aerial vehicle is preferably configured for vertical take off and landing (VTOL) to enable it to be used in a wide variety of situations, including in relation to fighting fires with its exhaust gasses.

19 Claims, 12 Drawing Sheets

(51) Int. Cl.

| | | |
|---|---|---|
| *B64C 27/20* | (2023.01) | |
| *B64C 29/04* | (2006.01) | |
| *B64D 1/16* | (2006.01) | |
| *B64D 25/12* | (2006.01) | |
| *B64D 27/20* | (2006.01) | |
| *B64D 27/32* | (2024.01) | |
| *B64D 27/33* | (2024.01) | |
| *B64D 31/16* | (2024.01) | |

(52) U.S. Cl.
CPC ............... *B64C 27/20* (2013.01); *B64D 1/16* (2013.01); *B64D 25/12* (2013.01); *B64D 27/20* (2013.01); *B64D 27/32* (2024.01); *B64D 27/33* (2024.01); *B64D 31/16* (2024.01)

(56) References Cited

U.S. PATENT DOCUMENTS

| | | | | |
|---|---|---|---|---|
| 3,481,405 | A * | 12/1969 | Ward | ........................ B64D 1/16 244/17.11 |
| 3,633,849 | A | 1/1972 | Kling | |
| 3,985,320 | A | 10/1976 | Brady | |
| 4,461,436 | A | 7/1984 | Messina | |
| 4,807,830 | A | 2/1989 | Horton | |
| 5,170,963 | A | 12/1992 | Beck, Jr. | |
| 5,421,538 | A | 6/1995 | Vassa | |
| 6,581,872 | B2 | 6/2003 | Walmsley | |
| 6,604,706 | B1 * | 8/2003 | Bostan | .................... B64C 17/06 244/6 |
| 6,698,685 | B2 | 3/2004 | Walmsley | |
| 6,705,905 | B1 * | 3/2004 | Tanaka | .................. B64C 39/062 244/50 |
| 7,044,422 | B2 * | 5/2006 | Bostan | .................... B64C 17/06 244/7 B |
| 7,108,228 | B1 | 9/2006 | Marshall | |
| 7,249,732 | B2 | 7/2007 | Sanders, Jr. | |
| 7,520,466 | B2 * | 4/2009 | Bostan | .................. B64U 50/14 244/12.3 |
| 10,450,063 | B1 | 10/2019 | Randall | |
| 10,661,892 | B2 * | 5/2020 | McCullough | .......... B64C 25/04 |
| 10,814,974 | B2 | 10/2020 | Randall | |
| 11,312,487 | B2 * | 4/2022 | McCullough | .......... B64D 35/00 |
| 11,485,489 | B2 * | 11/2022 | Kisly | ........................ B64C 3/20 |
| 11,485,490 | B2 * | 11/2022 | Petrov | .................... B64C 29/02 |
| 11,597,512 | B2 | 3/2023 | Randall | |
| 2003/0098388 | A1 | 5/2003 | Walmsley | |
| 2003/0127559 | A1 | 7/2003 | Walmsley | |
| 2004/0129828 | A1 * | 7/2004 | Bostan | .................... B64C 29/02 244/12.1 |
| 2006/0231675 | A1 * | 10/2006 | Bostan | .................... B64C 27/20 244/12.1 |
| 2007/0034738 | A1 | 2/2007 | Sanders, Jr. | |
| 2010/0012790 | A1 * | 1/2010 | Bostan | .................... B64C 3/385 244/23 A |
| 2014/0151494 | A1 | 6/2014 | Cvrlje | |
| 2017/0341725 | A1 * | 11/2017 | Skahan | .................. B64C 25/54 |
| 2018/0002011 | A1 * | 1/2018 | McCullough | .......... B64C 27/26 |
| 2018/0002016 | A1 | 1/2018 | McCullough | |
| 2020/0062385 | A1 | 2/2020 | Randall | |
| 2020/0317332 | A1 * | 10/2020 | Didey | .................... B64C 39/08 |
| 2021/0253238 | A1 | 8/2021 | Randall | |

* cited by examiner

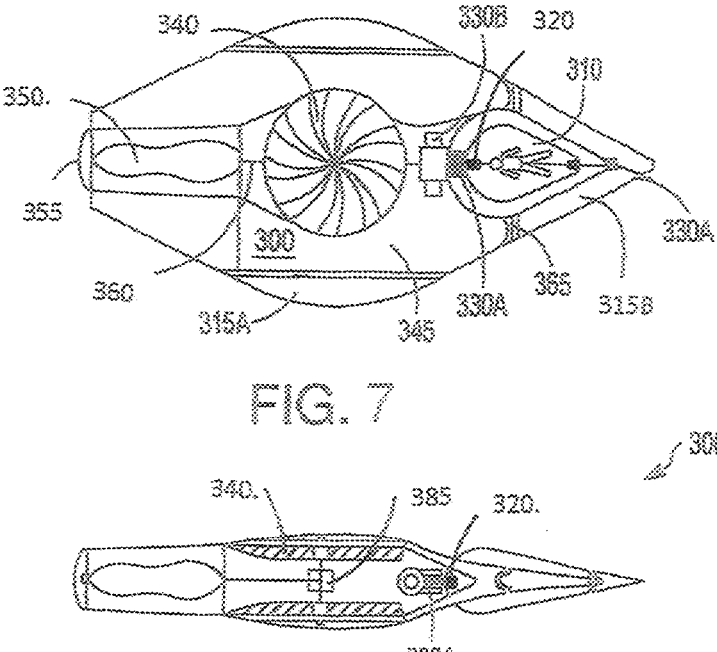
FIG. 7
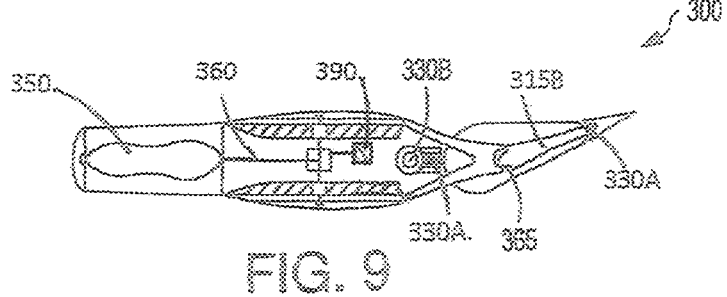
FIG. 8
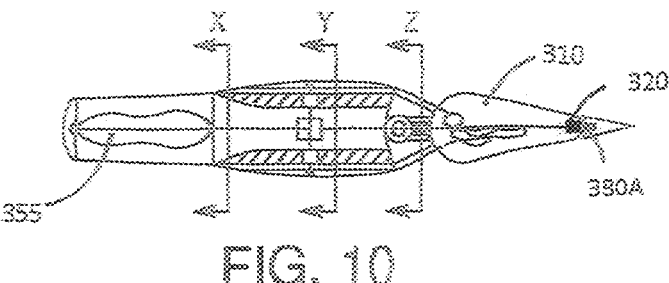
FIG. 9
FIG. 10

345.

310.

315A

GYROSCOPICALLY STABILISED FIREFIGHTING AERIAL VEHICLES

RELATED APPLICATIONS

The present application is a U.S. National Stage application under 35 USC 371 of PCT Application Serial No. PCT/AU2020/050038, filed on 23 Jan. 2020; which claims priority from AU Provisional Application No. 2019900211, filed 23 Jan. 2019, the entirety of which are incorporated herein by reference.

TECHNICAL FIELD

The present invention relates to gyroscopically stabilised aerial vehicles. More particularly, in preferred forms, the invention relates to aerial vehicles having gyroscopic fans with pivoting fan blades.

BACKGROUND

Any references to methods, apparatus or documents of the prior art are not to be taken as constituting any evidence or admission that they formed, or form part of the common general knowledge.

Since the invention of flight, a variety of different forms of aircraft have been developed such as, for example, helicopters and aeroplanes. There are many factors and forces involved in achieving stable and controllable flight, with different types of aircraft have different flying charac- teristics with various advantages and disadvantages.

For example, fixed wing aeroplanes can be configured to fly relatively fast over long distances but cannot fly too slow or hover and require long runways for horizontal take-off and landing. Helicopters, on the other hand, are able to take off and land vertically and can hover, but are more limited in their size, as well as the speed and distance they can travel. These characteristics make fixed wing aeroplanes well suited to long distance point to point travel of relatively large loads and helicopters well suited to shorter travel of a relatively small load and/or to emergency and rescue opera- tions where the ability to fly slowly and hover is particularly advantageous. It is desirable to provide an aerial vehicle that combines the advantages and/or minimises the disadvan- tages to at least provide an aerial vehicle with different, preferably more versatile, characteristics.

One application for the aerial vehicles described here is in the fighting of forest fires. Uncontrolled fires pose a serious problem today and large fires can rage out of control sweeping through woods/forests, communities, industrial areas and businesses resulting in loss of forests/woods, homes, other property, animals and even human life. Efforts employed to contain fires are not always successful. Con- trolling and preventing the spread of fires is often difficult.

There are many known methods and techniques for con- trolling and preventing the spread of fires. These methods include traditional uses of firefighters and equipment, including such techniques as the dumping of large amounts of water or fire suppressing chemicals from aircrafts onto the fire, creating fire lines across the direction of travel of the fire, spraying water or fire suppressing chemicals onto the fire by firefighters on the ground, and back burning an area towards the fire in a controlled manner so as to effectively remove wood or other sources of fuel from an approaching fire.

It has been found that the use of water and chemicals alone can be ineffective against larger fires. It has been hypothesised when a fire's intensity is greater than a certain threshold, the use of water and other fire suppressant mate- rial becomes largely ineffective because the water or fire suppressant evaporates or gets dissociated before reaching the core of the fire. In view of these issues, it is also desirable to provide an alternative method of suppressing fires, par- ticularly larger fires.

SUMMARY OF INVENTION

This invention relates to aerial vehicles preferably gyro- scopically stabilised, wherein the aerial vehicles comprise:

an aerodynamic body;

one or more jet turbines and or electric motors and or engines coupled to the aerodynamic body of an aerial vehicle frame and or fuselage, to provide thrust to the aerial vehicle, and for suppressing fire, the jet turbine and or motors and or engines having a source of fuel and or power, in the case of using one or more jet turbines, an engine has an air intake to draw air, and an outlet through which high speed combusted air fuel mixture as thrust is exhausted, and one or more electric motors and or engines provide thrust and or power to the aerial vehicle;

a central hub drive assembly and or radial distal ends of the fan blades assembly (Detail A shown in FIG. 5A and Detail B shown in FIG. 21) are configured to be driven and powered by the one or more jet turbines and or one or more motors and or one or more engines preferably spinning in opposite direction to each other (e.g. coaxially) and are substantially in the longitudinal configuration;

a central hub drive assembly and or radial distal ends of the fan blades assembly (Detail A shown in FIG. 5A and Detail B shown in FIG. 21) are configured to be driven by the one or more jet turbines and or one or more motors and or one or more engines are substan- tially perpendicular or in a substantially transverse configuration to each other;

one or more gyroscopic stabilisation assembly comprising one or more gyroscopic fan assembly, and or one or more disc assembly, configured to be driven by and or coupled to the one or more jet turbines and or motors and or engines by the central hub drive assembly and or radial distal ends of the fan blades drive assembly (Detail A shown in FIG. 5A and Detail B shown in FIG. 21);

wherein at least one of the gyroscopic members is con- figured to be rotationally driven by the jet turbines and or motors and or engines and gyroscopically stabilise the aerial vehicle during flight.

An aerial vehicle, wherein the gyroscopic stabilisation assembly is a gyroscopic fan arrangement comprising a plurality of alternating pivoting fan blades, preferably spin- ning in opposite direction to each other (e.g. coaxially), having a central hub drive assembly and/or a radial distal fan blade drive assembly (Detail A shown in FIG. 5A and Detail B shown in FIG. 21). It may be also noted that a small gyroscopic disk may be positioned and used in place of the gyroscopic fan assembly, this disc may provide the onboard sensors with movement relative to the ground such as trajectory, speed, pitch roll and yaw.

In an embodiment of the present invention. An aerial vehicle cockpit and or cabin module is movably coupled and designed for autonomous flight, or an aerial vehicle with an attached cabin for passengers and or cockpit module for crew or piloted flight and or a pivotally attached cabin and or cockpit module attached to the aerial vehicle frame and or fuselage;

A method of using one or more aircraft for suppressing a forest fire, and refers to the use of thrust from an aerial vehicle and the jet turbines and or motors and or engines such as electric motors attached to propellors blades, and e.g. (electric ducted fans) attached to an aerial vehicle for suppressing fire;

This method involves moving an aerial vehicle to a location in the vicinity of the fire, wherein the one or more jet turbines and or motors and or engines provide thrust to the aerial vehicle, and for suppressing fire, the jet turbines and or motors and or engines draw surrounding air, and provide high speed air as thrust to the aerial vehicle and for suppressing fire. The thrust is used as the firefighting extinguishing medium, the one or more aerial vehicles can hover above and in front of the fire front and direct the thrust from a power system, and in a desirable direction to blow the fire back on itself, the one or more aerial vehicles are at an altitude determined by the fires environmental factors such as fuel load and prevailing wind speed, this may be estimated between 100 m to 200 m above the fire and or canopy, and 25 m to 50 m in front of the fire front, the thrust systems of the jet turbines and or motors and or engines are orientation in the substantially vertical position relative to the horizon during firefighting operations, providing the necessary down force to support the aircraft during hover flight, and or for suppressing fire, and may have an air flow directing assembly, pivotally attached, enabling thrust augmentation, providing more stable flight and a higher efficiency for directing thrust for suppressing fire, the one or more aerial vehicles may fly in formation and or be attached to one another, moving along the fire line and or protecting high important assets such as people and or property and the environment;

> and wherein the aerial vehicle has a plurality of control surfaces, for controlling the aerial vehicle when fully autonomously and or crewed and or piloted, during flight and or during firefighting operations.

In an embodiment, the one or more gyroscopic member is a gyroscopic fan comprising a plurality of alternating fan blades. The gyroscopic fan preferably comprises a plurality of pivoting fan blades. Preferably the gyroscopic fan comprises a plurality of alternating pivoting fan blades. The orientation of the one or more of the fan blades for the fan is preferably variable to allow the pitch of said one or more blades to be varied. The one or more fan blades may be pivotally coupled to the central hub drive assembly and or radial distal ends of the fan blades assembly (Detail A shown in FIG. 5A and Detail B shown in FIG. 21), to allow the pitch of said one or more blades to be varied. In an embodiment, the gyroscopic member may comprise a gyroscopic disc. In an embodiment, the gyroscopic fan assembly provides reversed thrust (pitch reversal) to the aerial vehicle as (down force) acting against the (up force) thrust of the vertically orientated jet turbine. This thrust reversal can happen quicker than regulating the jet turbines and or motors and or engines thrust, due to time lag.

In an embodiment, the plurality of fan blades may be arranged around a centre hub drive assembly. Preferably spinning in opposite direction to each other (e.g. coaxially). The one or more fan blades may be pivotally coupled to the centre hub drive assembly to allow the pitch of said one or more blades to be varied. The central hub drive assembly is coupled to the aerial vehicle frame and or fuselage. The central hub drive assembly may further comprise a controller for controlling the gyroscopic stabilisation assemblies speed and pitch of the fan blades. The controller may control the gyroscopic stabilisation assembly via a gear box that may be orientated longitudinally, perpendicular or transverse to one another, such that angular momentum from the gyroscopic stabilisation assembly is significantly larger than the moment of inertia of the aircraft such that the aerial vehicle is substantially gyroscopically stabilised during flight. The aerial vehicles are preferably configured to allow vertical take off and landing (VTOL). The fan blades profile may be in various forms (e.g. straight, or curved).

In an embodiment, an aerial vehicle may be powered by one or more jet turbines and or one or more motors and or one or more engines providing power to the radially distal ends of the fan blades (Detail A shown in FIG. 5A and Detail B shown in FIG. 21) to allow the pitch of said one or more fan blades to be varied, the fan assembly may further comprise a controller for controlling the gyroscopic stabilisation assembly at the radial distal fan blade assembly (Detail A shown in FIG. 5A and Detail B shown in FIG. 21) ends are preferably contained within an opening of the aerodynamic body. Preferably the opening is a circular opening in the aerial vehicle frame and or fuselage of the aerodynamic body. Preferably spinning in opposite direction to each other (e.g. coaxially). The gyroscopic fan or disc assembly may be coupled to the aerial vehicle frame and or fuselage. The fan assembly may further comprise a controller for controlling the gyroscopic stabilisation assembly. The controller may control the pitch of the fan blades and the speed of the gyroscopic stabilisation fan assembly such that angular momentum from the gyroscopic stabilisation assembly is significantly larger than the moment of inertia of the aircraft such that the aerial vehicle is substantially gyroscopically stabilised during flight. The aerial vehicle is preferably configured to allow hovering and vertical take off and landing (VTOL). The fan blades profile may be in various forms (e.g. strait, or curved).

In an embodiment, the aerial vehicle, cabin and or aerial vehicle frame and or fuselage may further comprise a cockpit module. Wherein the cabin and or cockpit module is preferably coupled with the aerial vehicle frame. The cabin and or cockpit module is preferably movably coupled to the aerial vehicle frame and or fuselage. And or the cockpit and or cabin module may be pivotally coupled to the vehicle frame and or fuselage. And or the cockpit and or cabin module may be pivotally coupled to the vehicle frame and or fuselage by a gimbal. The cockpit module may comprise a counterbalance arrangement to stabilise the cockpit by countering the movement of the aerial vehicle frame and or fuselage and or exhaust of the jet turbine and or one or more motors and or one or more engines and or torque and or rotation of the one or more jet turbines and or engines or motors.

In an embodiment, the cockpit and or cabin module is pivotally attached to the aerial vehicle frame and or fuselage. A cabin and or cockpit module may be pivotally mounted to a gimbal ring for rotation about at least a first axis. The gimbal ring may be pivotally mounted to the aerial vehicle frame and or fuselage for rotation about a second axis.

In an embodiment, the cockpit and or cabin module is releasably coupled to the aerial vehicle frame and or fuselage such that the cockpit and or cabin module is detachable. The releasably coupling may allow the aerial vehicle to optionally have the cockpit and or cabin module attached for pilot assisted flying and or optionally have the cockpit and or cabin module detached for remote and/or autonomous flying. An autonomous aerial vehicle may comprise an aerial vehicle frame and or fuselage, control surfaces and a cabin for crew and or passengers. The releasable coupling may comprise an ejector assembly. The cockpit and or cabin module may be in the form of a self-contained pod.

In an embodiment, the body of the aerial vehicle comprises an aerial vehicle frame and or fuselage, cabin and or cockpit. And may comprise a plurality of control surfaces. The control surfaces are preferably movably attached to the fuselage and or aerial vehicle frame and or cabin and or cockpit for controlling flight of the aerial vehicle. The plurality of control surfaces may be manipulated to control the flight of the aircraft about a pitch axis transverse to the longitudinal axis of the aircraft and a yaw axis that is transverse to both the longitudinal axis of the aircraft and the pitch axis and about the roll axis during flight.

In an embodiment, the one or more jet turbines and or engines and or motors, the central hub drive assembly and/or a radial distal fan blade assembly, (Detail A shown in FIG. 5A and Detail B shown in FIG. 21) and the gyroscopic stabilisation assembly are arranged longitudinally. The one or more jet turbines and or engines and or motors, central hub assembly and/or a radial distal fan blade drive assembly (Detail A shown in FIG. 5A and Detail B shown in FIG. 21), and gyroscopic stabilisation assembly may be arranged to rotate about a longitudinal axis of the aerial vehicle as shown in aerial vehicle 100, 200 and 400.

In an embodiment, the one or more jet turbines and or engines and or motors, and gyroscopic stabilisation assembly are arranged transverse to each other. The one or more jet turbines and or engines and or motors and gyroscopic stabilisation assembly may be arranged such that their respective axes of rotation are perpendicular (or at least substantially perpendicular). Such that the one or more gyroscopic fans may be arranged in a plane that is perpendicular to the longitudinal axis of the one or more jet turbines and or engines and or motors as shown in aerial vehicle 300.

In an embodiment, parallel gyroscopic fans may be provided. A first fan may be located in an upper side of the fuselage and a second fan may be located in a lower side of the fuselage. The axial axis of the first fan and the axial axis of the second fan are preferably aligned. The central hub drive assembly may comprise a longitudinal shaft assembly, preferably coupled to the jet turbine, and or engines and or motors. The transverse central hub drive assembly is preferably coupled to the one or more gyroscopic fans. The upper fan may provide down thrust in the direction to the centre of the aerial vehicle. The lower fan may provide upward thrust in a direction to the centre of the aerial vehicle and provide additional air pressure at the turbine intake as shown in aerial vehicle 300.

In an embodiment, an air flow directing assembly may comprise an adaptor to direct the thrust towards a specific direction. In such embodiments, the thrust may be directed in a desirable direction to enable controlled flight of the aerial vehicle and for suppressing fires.

In an embodiment, the aerial vehicle further comprises a supporting structure positioned for supporting the one or more jet turbines and or engines and or motors, allowing directional movement of the one or more jet turbines and or engines and or motors. In such embodiments, the directional movement may allow the air flow directing assembly to direct some of the drawn air in a desirable direction, for stabilising flight such as hovering and take-off and landing and for suppressing fires.

In an embodiment, the aerial vehicle body may be annular. In such an embodiment, the aerial vehicle frame and or fuselage and or cabin and or cockpit may be in the form of a torus or 'doughnut' shape. Having one or more jet turbines and or engines and or motors, may be mounted to the sides of the aerial vehicle frame and or fuselage, preferably for propulsion and or lift thrust and or power to the aerial vehicle, and or suppressing fire. The plurality of jet turbines and or engines and or motors, mounted to the sides of the fuselage may be rotatable, preferably to enable VTOL capability. One or more jet turbines and or engines and or motors, may be mounted to an inner and or outer sides of the aerial vehicle frame and or fuselage. In an embodiment at least one gyroscopic fan is preferably located in the centre of the body. In an embodiment the gyroscopic fan may instead comprise a gyroscopic disk. A cockpit module may be located inside the cabin and or aerial vehicle frame and or fuselage of the aerial vehicle body.

In an embodiment of the invention provides a method of suppressing a fire, the method comprising the steps of:

moving an aerial vehicle with one or more jet turbines and or engines and or motors coupled to an aerial vehicle frame and or fuselage of the aerial vehicle to a location in the vicinity of the fire wherein the one or more jet turbines and or engines and or motors provides thrust and power to the aerial vehicle, and for suppressing fire, the one or more jet turbines and or engines and or motors having an air intake to draw surrounding air, an outlet through which air is exhausted at a high speed as thrust, and a gyroscopic stabilisation assembly having either a central hub drive assembly and or radial distal ends of the fan blade drive assembly (Detail A shown in FIG. 5A and Detail B shown in FIG. 21), preferably spinning in opposite direction to each other (e.g. coaxially) and are adapted to be driven by the one or more jet turbines and or engines and or motors, operating a gyroscopic stabilisation arrangement providing thrust to the aerial vehicle and for suppressing fire, coupled to the jet turbines and or engines and or motors by the central hub drive assembly and or radial distal ends of the fan blade drive assembly (Detail A shown in FIG. 5A and Detail B shown in FIG. 21) and gyroscopically stabilising the aerial vehicle during firefighting and flight; and operating the one or more jet turbines and or engines and or motors to draw air and controlling an air flow directing assembly for directing high velocity air as thrust from the outlet in a desirable direction for suppressing fires.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 7 is a top view of an aerial vehicle 300 in accordance with a further embodiment;

FIG. 8 is a side view of the aerial vehicle 300 with the cockpit module front wing assembly being shown in a non-pivoted position;

FIG. 9 is a side view of the aerial vehicle 300 with the cockpit module front pivot wing assembly being shown in an upwardly pivoted position;

FIG. 10 is a side view of the aerial vehicle 300 showing cross-sectional planes X-Z;

DETAILED DESCRIPTION OF PREFERRED EMBODIMENTS

Figure 1:
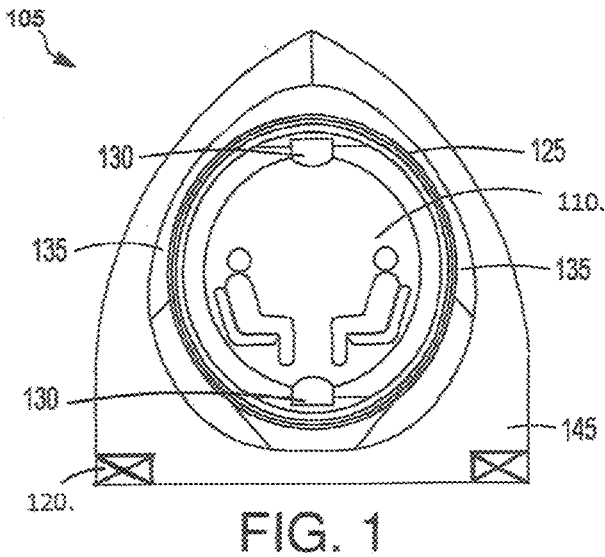
FIG. 1 is a side view of a detached self-contained gimbaled cabin and or cockpit module or pod, designed to be movably attached to an aerial vehicle frame and or fuselage, and showing the gimble rings arrangement on the outside of the gimble pivots and attachment ports in accordance with an embodiment of the present invention.
Figure 2:
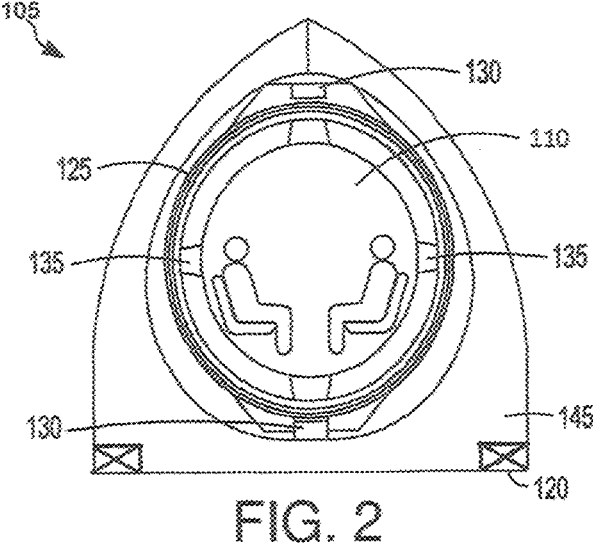
FIG. 2 is a side view of a detached self-contained gimbaled cockpit module or pod, designed to be movably attached to an aerial vehicle frame and or fuselage, and showing the gimble rings arrangement on the inside of the gimble pivots in accordance with an embodiment of the present invention.

FIGS. 1 and 2 illustrate a releasably attachable self-contained pod, cabin or cockpit module 105. In the preferred embodiment, the cabin and or cockpit module 110 is pivotally mounted to a gimbal ring 125 at attachment points 135 for rotation about a first axis. As seen most clearly in FIG. 2, a counterbalance arrangement 135 with a gimbal ring 125 is attached to the aerial vehicle frame 145 at attachment points 130 to allow rotation about a second axis thereby allowing the cabin 110 of the cockpit module 105 to roll or pitch which allows a counterbalancing force to be applied to the cockpit module 105.

Figure 3:
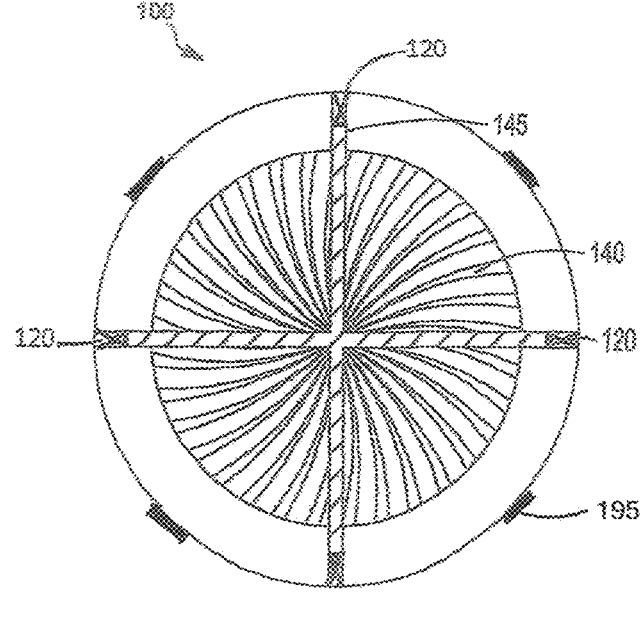
FIG. 3 is a top view of an aerial vehicle 100 in accordance with an embodiment of the present invention as an autonomous aerial vehicle.
Figures 18, 19:
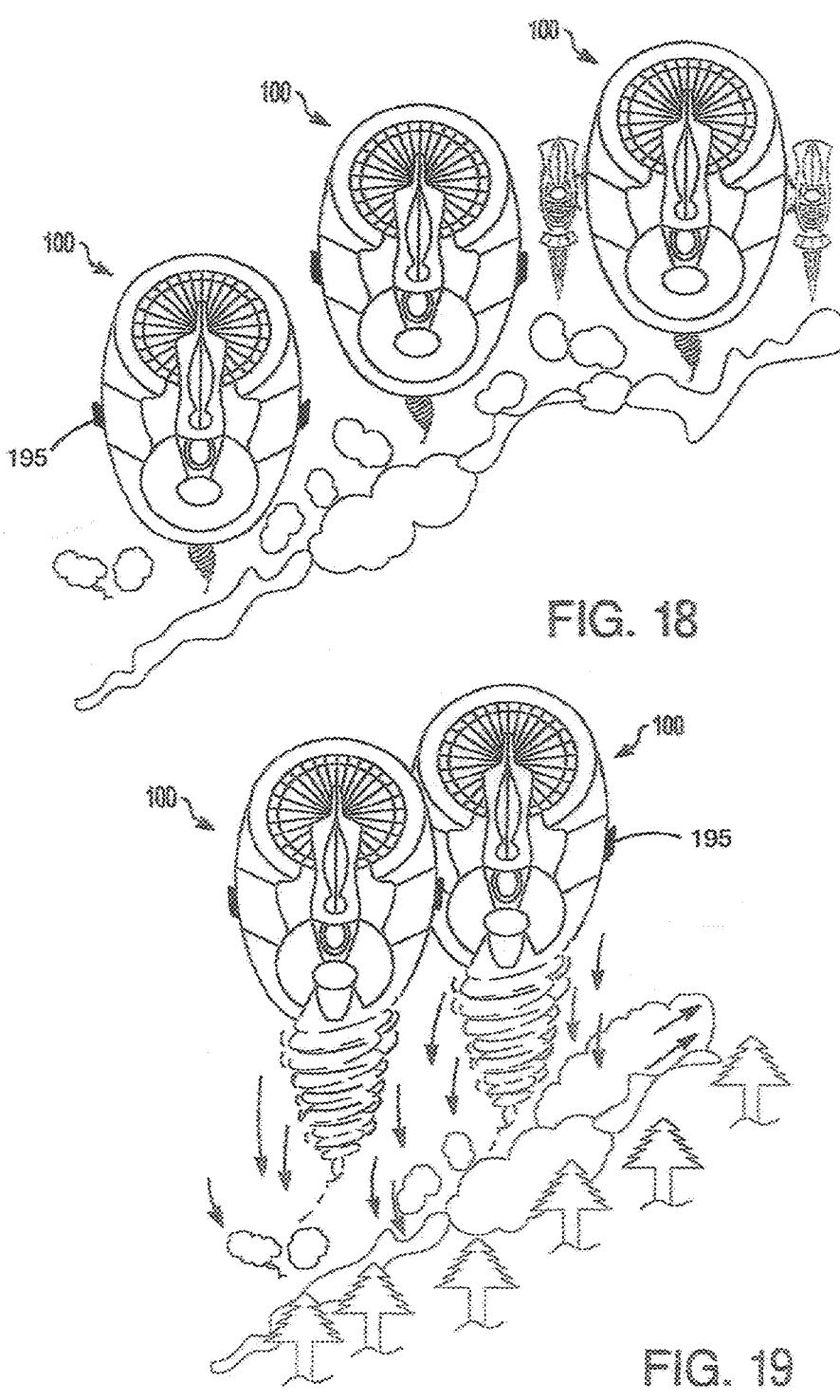
FIG. 18 is a perspective view of a plurality of aerial vehicles 100, without cockpit module, fighting a fire.
FIG. 19 is a perspective view of two linked aerial vehicles 100, without cockpit module, fighting a fire.

FIGS. 3, 18 and 19 illustrate a first embodiment of an aerial vehicle 100 configured to be gyroscopically stabilised and have control surfaces and one or more jet turbines and or motors and or engines attached to the aerial vehicle frame and or fuselage. FIG. 3. Shows a top view of aerial vehicle 100. As the aircraft can be attached to another aircraft, shows attachment points 195.

Figure 4:
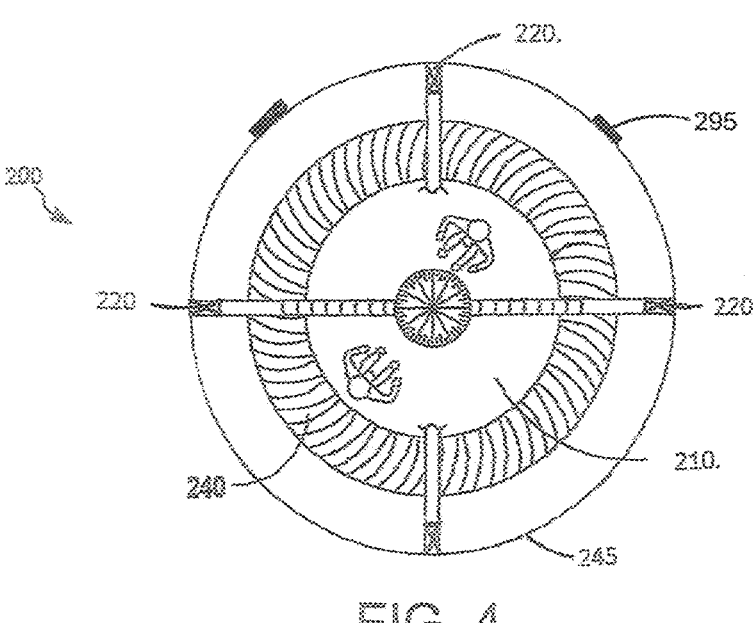
FIG. 4 is a top view of the aerial vehicle 200 with a cockpit module 210 mounted thereto in accordance with another embodiment of the present invention.
Figure 5A:
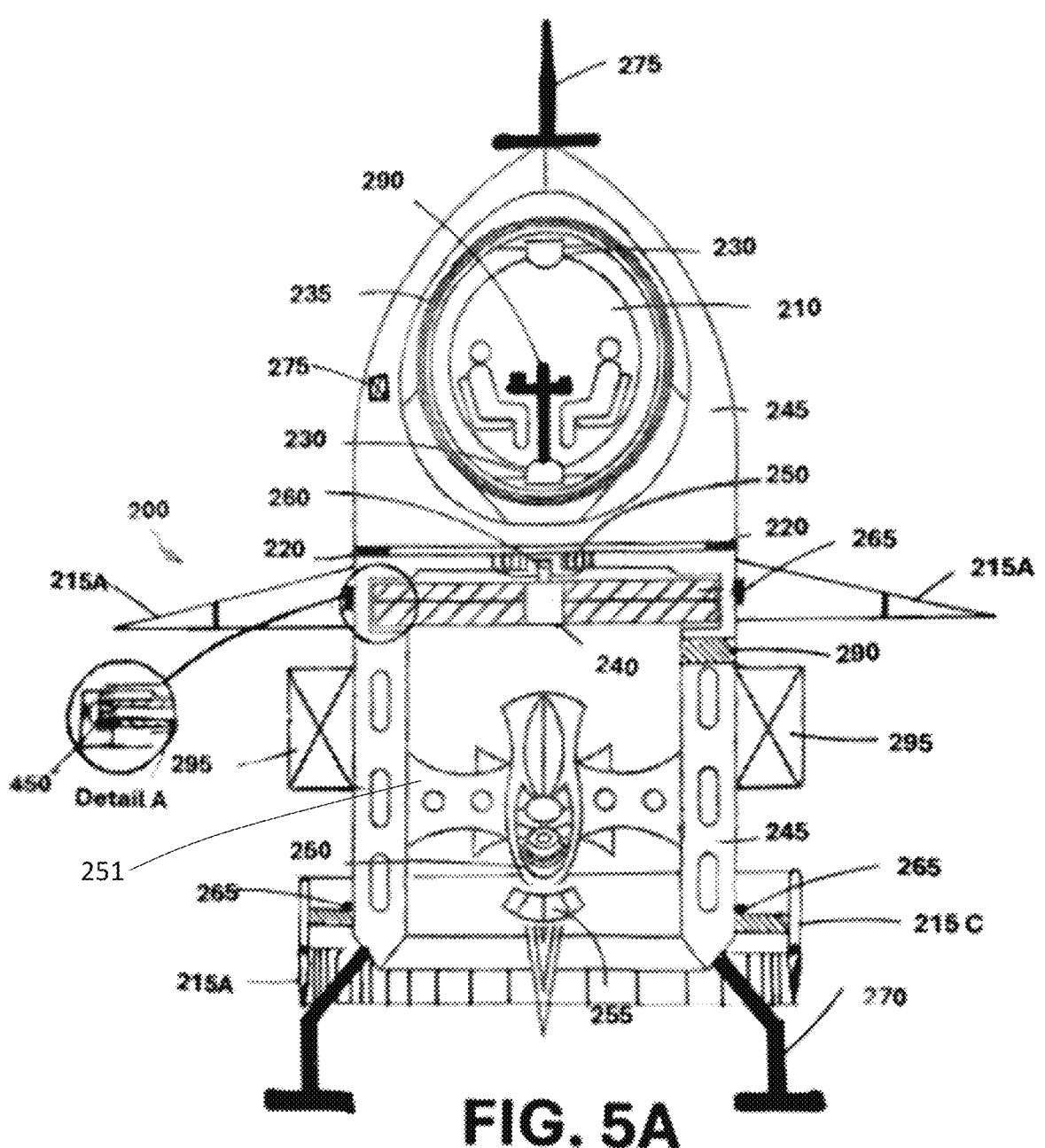
FIG. 5A is a side view of the aerial vehicle 200, with the cockpit module, a jet turbine and or engines and or motor 250 arranged longitudinally, in a first position (take-off or landing)
Figure 5B:
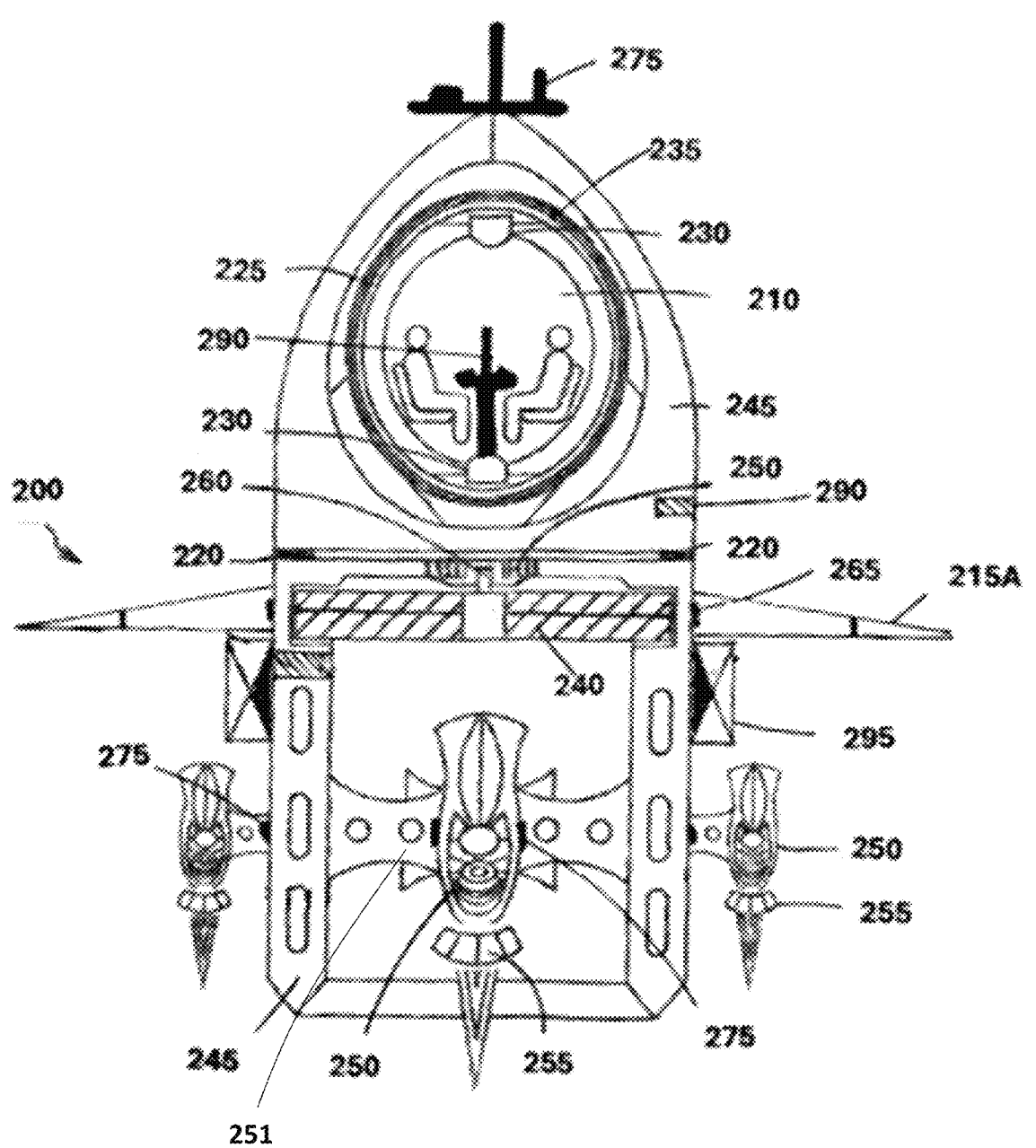
FIG. 5B is a side view of an alternative configuration of the aerial vehicle 200, with a plurality of jet turbines and or engines and or motors 250.
Figure 6:
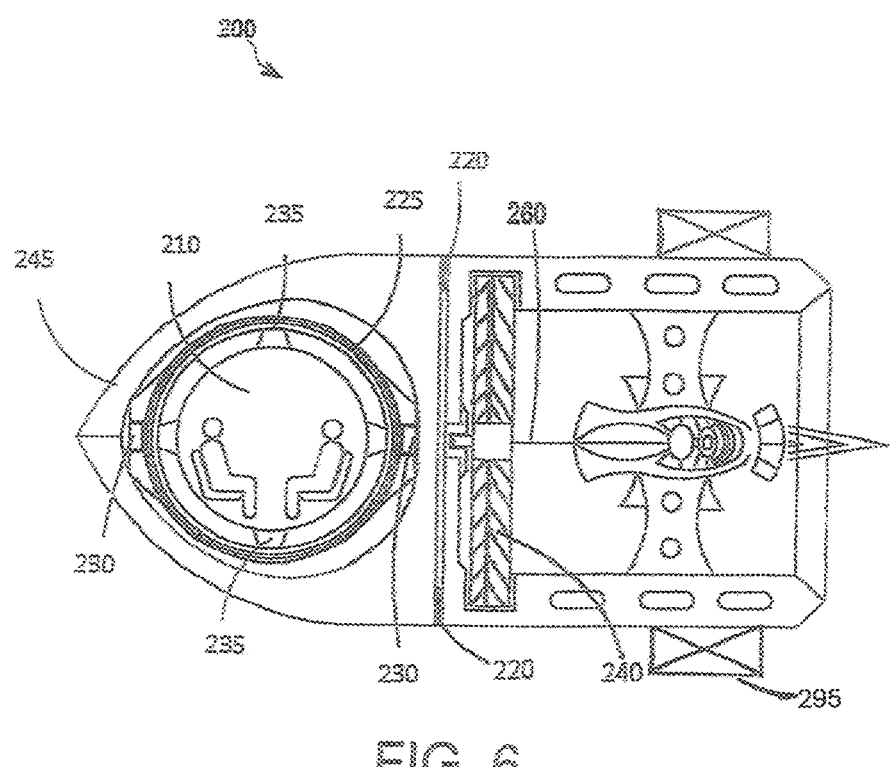
FIG. 6 is a side view of the aerial vehicle 200, with the cabin or cockpit module and a central hub drive assembly, and gyroscopic fan assembly in a second position (in-flight)
Figure 11:
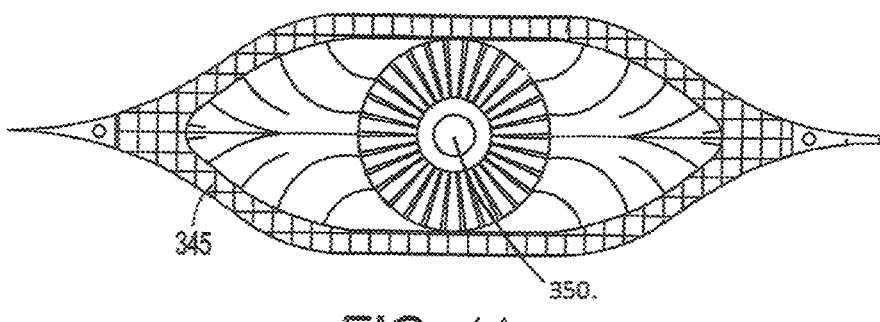
FIG. 11 is a sectional view of the aerial vehicle 300 along plane X (shown in FIG. 10)
Figure 12:
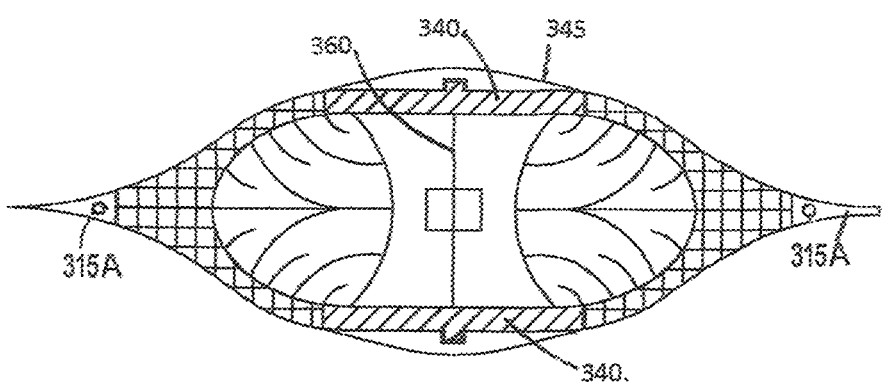
FIG. 12 is a sectional view of the aerial vehicle 300 along plane Y (shown in FIG. 10)
Figure 13:
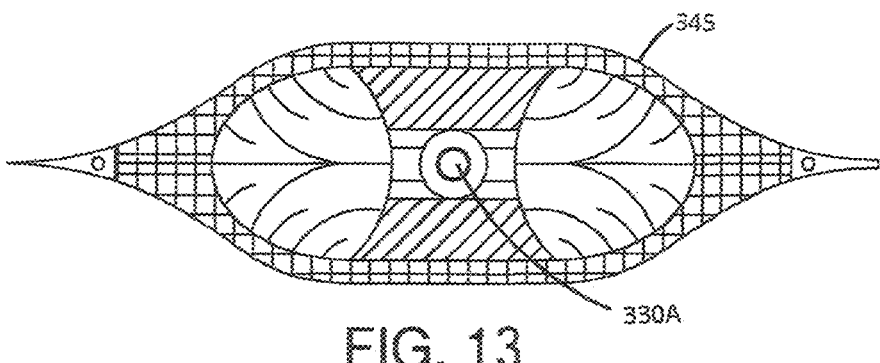
FIG. 13 is a sectional view of the aerial vehicle 300 along plane Z (shown in FIG. 10)
Figure 14:
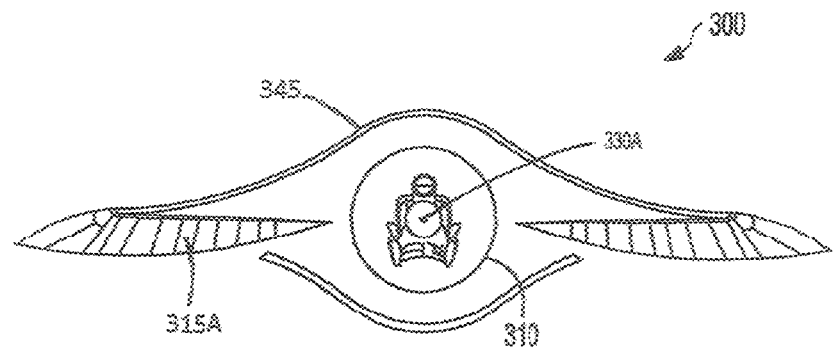
FIG. 14 is a frontal view of the aerial vehicle 300.
Figure 15:
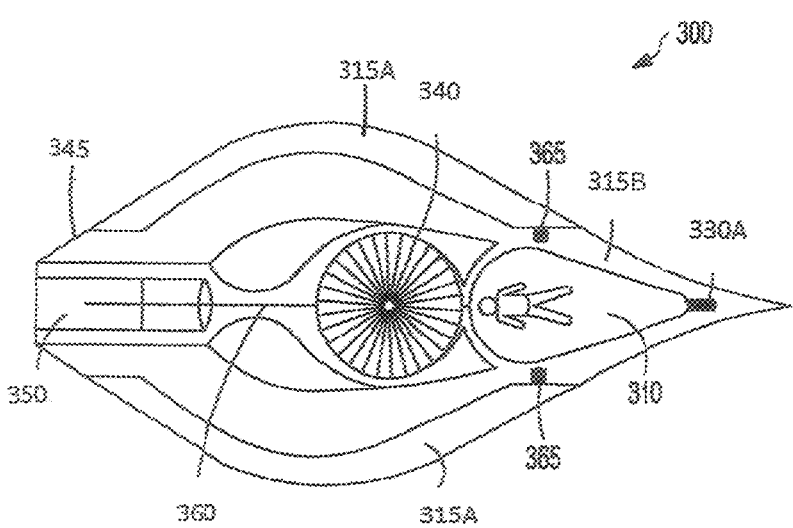
FIG. 15 is a top view of the aerial vehicle 300.
Figure 16:
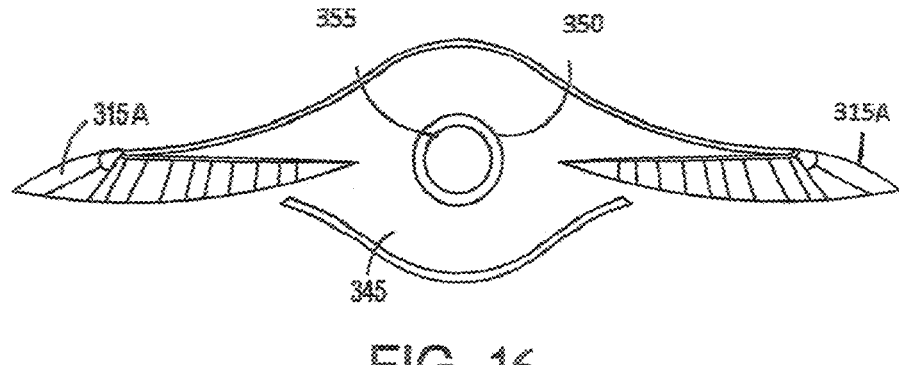
FIG. 16 is a rear view of the aerial vehicle 300.
Figure 17:
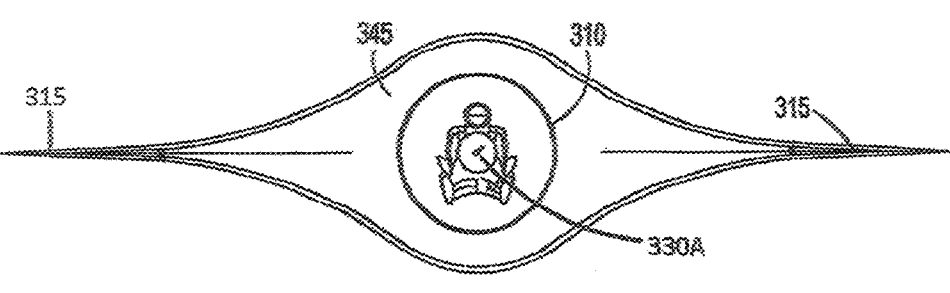
FIG. 17A is a frontal view of the aerial vehicle 300 with wing flaps in a different position to that illustrated in FIG. 14.
FIG. 17B is a frontal view of the aerial vehicle 300 with wing flaps in a different position to that illustrated in FIG. 17A.
Figure 17:
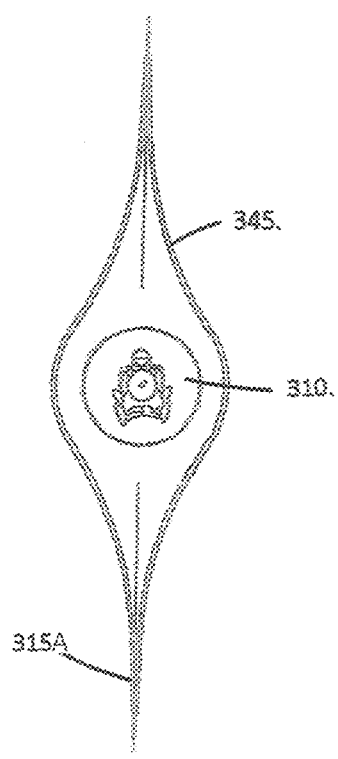

When a cabin and or cockpit module 105 is attachable to an aerial vehicle 100 such that aerial vehicle 100 forms aerial vehicle 200 as shown in FIGS. 4. to 6. In FIG. 4. Shows a top view of aerial vehicle 200 showing the attached cabin or cockpit from above. As the aircraft can be attached to another aircraft, shows attachment points 295. FIGS. 5A and 5B, the cockpit module 210 is shown in a first upright vertical position when the aerial vehicle 200 is in a take-off or landing position. In FIG. 6, the cabin and or cockpit module 210 is shown in a horizontal flying position whereby the cabin and or cockpit module 210 can be seen in an upright position even though the aerial vehicle has transitioned between vertical and horizontal position, thus the cabin and or cockpit module 210 itself has rotated. It is also worth noted that the cabin and or cockpit modules position may be influenced by gravity and centrifugal forces acting on the pivots by the aerial vehicle's movements. The aerial vehicle 100 and 200 may comprise a ducted aerial vehicle frame 145 and 245 and or fuselage that includes an opening in which one or more jet turbines and or motors and or engines 150 and 250 can be positioned to provide a propulsion mechanism to the aerial vehicle and for firefighting.

Figure 20:
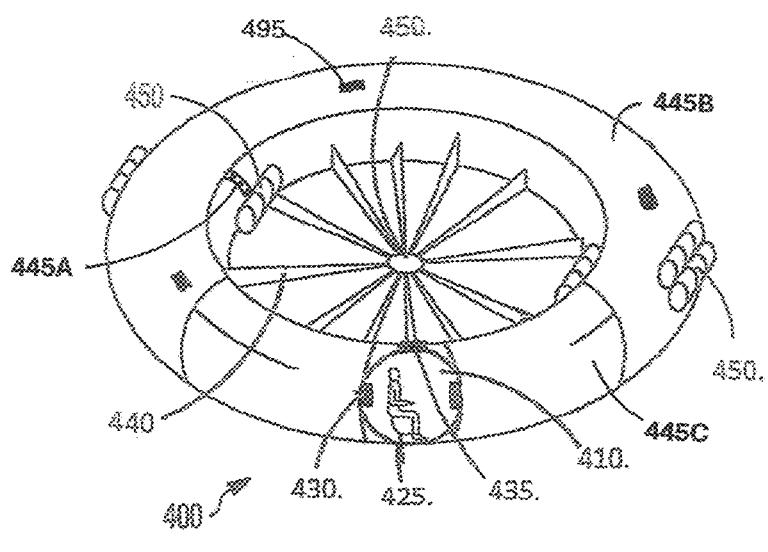
FIG. 20 is a perspective view of an aerial vehicle 400 in accordance with a further embodiment.
Figure 21:
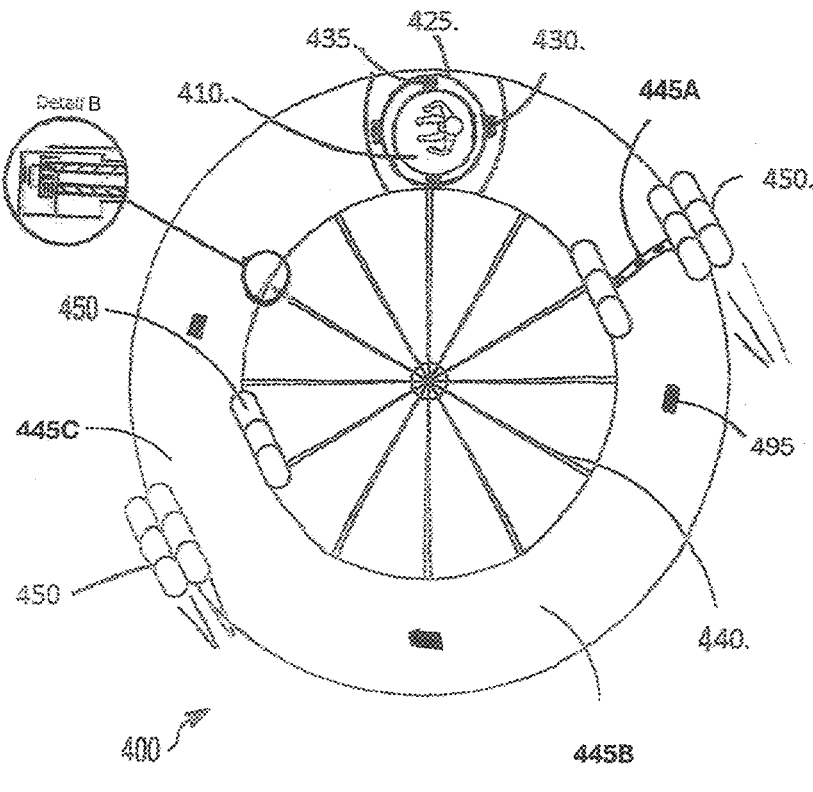
FIG. 21 is a top view of the aerial vehicle 400 illustrated in FIG. 20.

FIGS. 20 and 21 illustrate a perspective and a top view of an embodiment of the present invention, being annular in form and shape, (donut shaped). This shaped aerial vehicle is also a VTOL aircraft and has the ability to take off and land on either land and or water-based surfaces and can be used in fighting fire, freight cargo, and passenger transport. This aircraft may also be attached to one another via attachment ports. And have one or more gyroscopic fans and or gyroscopic discs position central, relative to the aerial vehicle frame and or fuselage and the cabin and or cockpit. The aerial vehicles may have one or more jet turbines and or motors and or engines attached to the inner and or outer surfaces of the aerial vehicle frame and or fuselage, and for powering the central gyroscopic fan and or disc, providing lift and forward thrust to the aerial vehicle and providing stabilised flight characteristics and thrust for suppressing fire. The aerial vehicle, has control surfaces that enable autonomous and or piloted flight.

In an embodiment one or more jet turbines and or motors and or motors and or engines 150, 250, 350 and 450 may be used, and are preferably pivotally attached to the aerial vehicle frame and or fuselage 145, 245, 345 and 445B. The use of jet turbines preferably works like any other jet turbine whereby air is drawn in by the turbine and a compressor raises the pressure of the air. The compressor is made with many blades attached to a central shaft, this compressor shaft may be attached to a central hub drive assembly 260 by a shaft and or gear box arrangement. The turbine blades spin at high speed and compress or squeeze the air. This compressed air is then sprayed with fuel and an electric spark ignites the air fuel mixture. The burning gases expand and blast out of the turbine nozzle and may be directed through an air flow directing assembly 155, 255, 355 and 455 at the back of the engine. As the jets of gas shoot backward, the engine and the aerial vehicle 100, 200, 300 and 400 is thrust in an opposite direction, best described as (Newtons 3rd law of motion. As the hot air is going towards the air flow directing assembly 155, 255, 355 and 455 it passes through another group of blades called the turbine. The turbine shaft may be directly or indirectly attached or powered, to provide spin or torque to the drive assembly 160, 260, 360 and 460 via a gear box arrangement or eg (hydraulic pneumatic electronic, other drive mechanisms not described here can also be utilised for this purpose) and as the turbine spins, it in turn spins the compressor and causes the compressor to spin, aiding in each other's motion.

In this embodiment, the aerial vehicle frame and or fuselage 145, 245, 345 and 445B is shown to be of a specific shape that is generally symmetrical about an axis. However, the shape of the aerial vehicle frame 145, 245, 345 and 445A and or fuselage is not to be regarded as limiting and the shape of the fuselage 145, 245, 345 and 445B aerial vehicles and may be varied in other embodiments. The one or more jet turbines and or motors and or engines 150, 250, 350 and 450 may drive a central hub drive assembly 160, 260, 360 and 460 which may also be coupled to or powered by one or more jet turbines and or engines and or motors, a gyroscopic stabilisation assembly comprising a gyroscopic stabilisation fan assembly 140, 240, 340 and 440. The gyroscopic stabilisation fan assembly 140, 240, 340 and 440 assists with stabilisation of the aerial vehicle 100, 200, 300 and 400 during flight and firefighting.

In an embodiment of the invention, the blades of the gyroscopic stabilisation fan assembly 140, 240, 340 and 440 may be arranged around a central hub drive assembly 160, 260, 360 and 460 and may be coupled to and or powered by the one or more jet turbines and or engines and or motors 150, 250, 350 and 450. The gyroscopic fan blade assembly may alternatively be attached via the radial distal ends of the blades, shown in Detail A shown in FIG. 5A and Detail B shown in FIG. 21. This shows the radial distal ends of the fan blades attached, supporting pitch reversal, changing the thrust direction of the fans, preferably spinning in opposite direction to each other (e.g. coaxially) and may be contained within an opening of the aerial vehicle frame and or fuselage 145, 245, 345, and 445B. The blades of the gyroscopic stabilisation fan assembly 140, 240, 340 and 440 are alternating pivoting fan blades that vary the angle of the one or more fan blades as needed to provide the necessary stabilisation to the aerial vehicle 100, 200, 300 and 400. In a preferred embodiment, the longitudinal axis of the aerial vehicle frame and or fuselage 145, 245 and 445B extends longitudinally through the ducted opening along the central hub drive assembly 160, 260 and 460 or may alternatively be the radial distal blade assembly (Detail A shown in FIG. 5A and Detail B shown in FIG. 21) that drives the blades of the gyroscopic stabilisation fan assembly 140, 240 and 440. The gyroscopic stabilisation fan assembly 140, 240 and 440 this includes a plurality of blade members that are preferably individually variable pitch blades such that the pitch of one or more blades can be changed by pivoting the blade members. Since the blade members are of variable pitch, i.e. each blade member can pivot independently about its longitudinal axis (its pitch axis) in order to adapt the orientation of its leading edge to engine speed. The orientation of the blade members (also referred to as the pitch setting) thus constitutes one of the parameters that enable the thrust of the jet turbine and or engines and or motors, 150, 250, 350 and 450 to be managed easily. The fan blades can provide pitch reversal, acting against the thrust of the jet turbines and or engines and or motors, stabilising the altitude of the aerial vehicle rapidly, providing substantially better flight stability and control during firefighting operations. As a fire presents high turbidity of air movements, these vortices or thermals can be overcome through the fans pitch reversal mechanism.

It is important to appreciate that the provision of the gyroscopic stabilisation arrangement in combination with the jet turbines and or engines and or motors 150, 250, 350 and 450 provides a vertical take-off and landing (VTOL) capabilities for each aerial vehicle variation 100, 200, 300 and 400. Providing an aerial vehicle with VTOL capability allows the aerial vehicle 100, 200, 300, and 400 to be used in a large variety of situations including, for example, passenger and freight transport and described here within for firefighting efforts, especially where access to, an area proves otherwise difficult, impossible or dangerous as conventional water bombing firefighting methods require a water source and or a designated airfield to return to in order to replenish the fire suppression medium (in this case water and or retardant) and fuel. Due to the VTOL characteristics of aerial vehicle 100, 200, 300 and 400 do not require to land and refuel at a designated airfield, as the payload is fuel only. Instead can have the fuel e.g. (for a engine) and battery or power e.g. (for an electric ducted fan) brought to the fire front and exchanged, such as an empty fuel container for a full one or can be refilled. In the case of an electric ducted fan, the battery or power supply can be exchanged or can be recharged quickly infield.

In an embodiment the aerial vehicle 200, 300 and 400 may have a cockpit module 210, 310 and 410. The aerial vehicle 200, 300 and 400 has an ejector assembly 220, 320 and 420 adapted to eject the cabin and or cockpit module 210, 310 and 410 from the rest of the aerial vehicle 200, 300 and 400. For aerial vehicle 200 in the process, when the cabin and or cockpit 210 is removed forms aerial vehicle 100. Multiples of aerial vehicles 100, 200 and 400 can attach via attachment ports to one or more aerial vehicles 100, 200 and 400.

The gyroscopic stabilisation arrangement is preferably configured to provide sufficient angular momentum, by sufficient mass angular velocity, such that the aerial vehicle 100, 200, 300, and 400 is gyroscopically stabilised during various phases of flight. In one embodiment the jet turbines and or engines and or motors may be fixedly attached to the airframe and or fuselage. In another embodiment, the jet turbines and or engines and or motors may be pivotably mounted to the airframe and or fuselage especially when the air flow directing assembly of the jet turbine and or engines and or motors, needs to be directed towards a fire front, or maintaining hover and hold or take-off and landing.

In a preferred embodiment, each aerial vehicle frame and or fuselage of the aerial vehicle body is adapted to allow the respective aerial vehicle 100, 200, 300, and 400 to land and take-off in a vertical take-off or landing (VTOL) profile. In particular, an undercarriage assembly comprising landing gear in the form of landing struts may allow the aerial vehicle to take-off from a land based surface or a water based surface, with the plane of the one or more fan blades of the gyroscopic fan being substantially parallel to the plane of the horizon to allow the aerial vehicle to land in a similar manner. In the preferred embodiment, the cabin and or cockpit may be pivotally or movably attached to the aerial vehicle's frame and or fuselage which may allow relative movement between the cabin and or cockpit and the aerial vehicle frame.

The aerial vehicle 100, 200, 300 and 400 can also be equipped with annular wing flaps that may be mounted to the outer lateral surfaces of the aerial vehicle frame and or fuselage. The annular wing flaps may also provide additional flight surfaces to facilitate horizontal flight of the vehicle 100, 200 and 400 (such as illustrated in FIGS. 3 to 6). It should also be appreciated that in a horizontal flying configuration, the plane of the gyroscopic stabilisation arrangement would be substantially perpendicular to the plane of the horizon as shown in FIG. 6. It will, however, be appreciated by persons of ordinary skill in the art, by the description here within, that the provision of the flight surfaces and annular wing flaps may be optional.

As has been described in the earlier sections, the aerial vehicle 100, 200, 300 and 400 includes a gyroscopic stabilization arrangement which gyroscopically stabilises the aerial vehicle 100, 200, 300 and 400 during its entire flight envelope. It is important to appreciate that the use of gyroscopic stabilisation assembly results in a more stable aerial vehicle thereby providing stable flight characteristics which is very important for achieving the flexible and versatile flight characteristics for a variety of applications including, for example, in fire and rescue missions and in suppressing fires. Each of the blade members of the gyroscopic stabilisation fan assembly 140, 240, 340 and 440 can either be attached to a rotating hub drive assembly 160, 260, 360 and 460 or the radial distal ends of the fan blade assembly shown in (Detail A shown in FIG. 5A and Detail B shown in FIG. 21) so as to generate sufficient angular momentum such that the aircraft is gyroscopically stabilised so that when the external or internal moments of inertia are applied to the aircraft, the resulting force of the moments is translated into gyroscopic precession stabilising the aircraft. It should be appreciated that a larger aerial vehicle with increased power size, has increased performance will require larger gyroscopic stabilisation members or gyroscopic stabilisation members that are rotated at higher angular velocities in order to gyroscopically stabilise the vehicle. Similarly, smaller and more lightweight aircraft require smaller and more lightweight gyroscopic stabilisation members.

Aerial vehicles 200, 300 and 400 may also include a cockpit module 210, 310 and 410 which is coupled, preferably via an ejector assembly 220, 320 and 420 with the aerial vehicle frame and or fuselage 245, 345 and 445B. The cockpit module 210, 310 and 410 includes a counterbalancing arrangement 230, 330 and 430 to counterbalance the cockpit module 210, 310 and 410 by countering the movement of the aerial vehicle frame and or fuselage 245, 345 and 445B and/or exhaust and or rotation toque of the jet turbines and or motors and or engines 250, 350 and 450. In an embodiment, the cabin and or cockpit module 210, 310 and 410 may comprise a gimbal like mechanism to allow a cabin and or a cockpit 210, 310 and 410 rotational movement and if crewed and or piloted and or has passengers, its occupants, would be positioned in a substantially upright position during the entire flight envelope in all periods of flight, including both during vertical take off and horizontal flight. The cockpit module 210, 310 and 410 may include navigation and flight control equipment for controlling the aerial vehicle 200, 300 and 400 and also address some of the safety requirements. A controller 190, 290, 390 and 490 may also be provided for controlling the gyroscopic stabilisation arrangement via a gear box 185, 285, 385 and 485 such that angular momentum provided by the gyroscopic stabilisation arrangement (particularly the fan blades pitch and speed of rotation of the gyroscopic stabilisation fan assembly 140, 240, 340 and 440) is significantly larger than the moment of inertia of the aerial vehicle 100, 200, 300 and 400 so that the aerial vehicle 100, 200, 300 and 400 is substantially gyroscopically stabilised during flight.

Suitable turbines and or motors and or engines that can be employed to generate an exhaust thrust include pulsejet engines, turbojet engines, turbojet engines with afterburner, axial-flow turbojets, gas turbine propulsion engines, rocket engines, turbofan aircraft engines, low-bypass turbofans, high-bypass turbofans, turboprops, ramjets, turboshaft engines, underwater jet engines, shockwave triple engine jet trucks, electric ducted fans, and other hybrids and or in combinations and may include different types of power systems also can be used.

In firefighting embodiments of the invention, allows aerial vehicles 100, 200, 300 and 400 which is a preferred but by no means essential application. The high speed thrust may be obtained from one or more jet turbines and or engines and or motors. As used in this case herein, the term "jet turbine" refers to a turbine that accelerates and discharges a fast moving jet of fluid, e.g., a gas such as exhaust gas, to generate propulsion or thrust for the aerial vehicle and for suppressing fire. In a typical jet engine air from an air intake is directed into a rotating compressor where its pressure and temperature are increased. Pressurized air is introduced to a combustion chamber where it is combined with fuel and the mixture is ignited. The combustion raises the temperature of the gases, which expand through the turbine. In the turbine some of the temperature rise is converted to rotational energy, which can be used to drive the compressor. A combusted gas mixture (which is generally devoid of oxygen) exits through an exhaust air directing assembly which includes an air flow directing assembly 155, 255, 355 and 455 and directing the thrust in a desirable direction for suppressing fire and reducing the oxygen level at the fire zone, this method is essentially a Co2 fire extinguisher, whilst the high volume and velocity of the thrust provides sufficient force to change the direction of wind at the fire zone, blowing the fire back on itself, and extinguishing the fire.

Preferably the turbine is a gas turbine, which acts like a windmill, extracting energy from the hot gases leaving the combustor. Suitable types of turbines that can be utilized include transonic turbines, contra-rotating turbines, statorless turbines, ceramic turbines, shrouded as well as shroudless turbines, electric ducted fans and others known in the art. Micro turbines may also be used in at least some embodiments.

The air flow directing assembly 155, 255, 355 and 455 can be a convergent-divergent, divergent, fluidic, variable, e.g., ejector nozzles, iris nozzles, or can have another suitable design. Generally, when using a jet turbine, the exhaust thrust that exits the exhaust nozzle, through an air flow directing assembly 155, 255, 355 and 455 the exhaust is characterised by its temperature, chemical composition, velocity, delivery volume, rate of delivery, pressure and by other parameters, e.g., noise, air quality, and so forth. Exhaust from a jet engine can have a temperature of several hundreds degrees and piping and exhaust nozzles may need to be protected by air cooling this may be achieved via the use of an aspirator adapted as a shroud to provide an increased the air flow for fire suppression and providing cool air at the nozzle exit of the turbine.

The exhaust from such an aerial vehicle is considered to be particularly well suited for suppressing fires by using the exhaust generated by one or more engines, preferably jet turbine engines. More specifically, the invention relates to using the exhaust to supress a forest fire such as bushfires and wildfires and include dwellings, commercial or industrial fire.

With respect to its chemical composition, the exhaust gas from a jet turbine generally includes products of combustion, e.g., carbon dioxide ($CO_2$), carbon monoxide (CO), and water ($H_2O$), un-combusted gas, e.g., nitrogen gas ($N_2$), oxygen (O2), uncombusted hydrocarbons (UHC) and other components such as soot (C), oxides of nitrogen (NOx) and/or oxides of sulphur (SOX). Compared to atmospheric air, which at sea level contains close to 21% by volume O2 and about 0.03% by volume CO2, jet engine exhaust has lower O2 and higher CO2 levels. For instance, the pressurized emission products of the complete combustion of hydrocarbon fuels in an efficiently operated turbine engine are comprised of about 72% volume/volume CO2 gas and about 27.6% volume/volume of steam. As a result, the chemical composition of the exhaust gas plays an important role when the aerial vehicle 100, 200, 300 and 400 is utilised for control or extinguish a forest fire by directing the air flow directing assembly 155, 255, 355 and 455 in a desirable direction towards the fire. The ratio of air to fuel may also be manipulated by using a throttle mechanism, diluting with inert gases or by other means which may further lower the oxygen concentration in the exhaust resulting in improving the fire-fighting capabilities of the aerial vehicle 100, 200, 300 and 400.

As explained in the previous sections, using jet turbines results in jets of gases being directed away from the aerial vehicle 100, 200, 300 and 400 at extremely high velocities. During a fire suppressing operation, it is likely that there may be a considerable distance between the aerial vehicle 100, 200, 300 and 400 and the fire front, or leading edge of a fire, the aerial vehicle 100, 200, 300 and 400 should be capable of generating sufficient high exhaust pressure to blow significant quantities of exhaust gas mixture into the fire from such a distance. By way of example, any Pratt & Whitney JT8 through JT30 series turbine or similar turbine such as the GE90-115Bhigh bypass providing excellent thrust to weight characteristics. In a use case of just one GE90-115B having a weight of 9.6 T was incorporated into one aerial vehicle (100 or 200 for example), having a total aircraft weight of 15 T, noting fuel consumption is at maximum 100% thrust output of a GE90-115B is 50 T. As the payload of the firefighting aerial vehicle is fuel only, can carry up to 30 T of fuel safely. At a burn rate of 4 kg/s This would provide the aerial vehicle with an extended flight time and firefighting ability of approximately 2 hours (based on if the turbine was at maximum thrust for the entire flight envelope). It is also worth noting that as the aerial vehicle weight is 15 Ton, and for the aircraft to be able to hover, then the turbine thrust output would match this to become stable during hover, including that the gyroscopic fan can provide extra (down thrust) acting against the turbines (upward thrust), this then would provide an even longer flight duration due to the reduced fuel consumption. And as more than one jet turbine can be attached to the one aerial vehicle, is capable of providing sufficient propulsion to fly the aerial vehicle 100, 200, 300 and 400, whilst also provide sufficient and significant volumes of high velocity thrust of inert exhaust gases that are capable of extinguishing even the largest forest fires. It might be important to take into account some practical considerations such as not operating the jet turbine at 100% capacity in order to control the temperature of the exhaust gases particularly during a fire suppression operation. It is also important to note that other turbines fully capable of use in the present circumstances may provide different effective ranges of exhaust pressures may be used for providing the desired fire suppression functionality.

Advantageously, the one or more jet turbines and or motors and or engines 150, 250, 350 and 450 may be mounted on a support structure 251 that not only supports the jet turbines and or motors and or engines 150, 250, 350 and 450 but also allows the jet turbines and or motors and or engines 150, 250, 350 and 450 to be moved in a plurality of directions. In at least some embodiment, the support structure 251 may allow the turbine to be rotated 360 degrees. A steering assembly may be coupled with the support structure 251 and be controlled autonomously or by a remote operator and or piloted, enabling the aerial vehicle to control the orientation of the jet turbines and or motors and or engines 150, 250, 350 and 450 in order to direct the high velocity thrust in a desirable direction in order to supress a fire.

As shown in FIG. 18, a plurality of such aerial vehicles 100 may be used to fight a fire. As shown in FIG. 19, two (or more) such aerial vehicles 100 may be coupled together in tandem by provision of attachment ports to allow such multiple aerial vehicles 100 to be coupled together via the attachment ports. The one or more gyroscopic fans 140 may be linked to the jet turbines and or engines and or motors 150 by electronic or other mechanical arrangements. It is also possible for aerial vehicles 200 and 400 may be attached to each other and or one another.

FIGS. 7 to 17 illustrate another embodiment of an aerial vehicle 300. The aerial vehicle 300 is also adapted to be gyroscopically stabilised by a stabilising arrangement comprising gyroscopic fans 340 with variable pitch blades. The gyroscopic fan 340 is arranged in a plane that is transverse and or is substantially perpendicular to the longitudinal axis of the jet turbine and or engines and or motors 350. The gyroscopic fan 340 may be mechanically, pneumatically, hydraulically or electronically actuated when coupled to or powered by the one or more jet turbines and or engines and or motors 350 by a central hub drive assembly 360 which transfers power from the jet turbines and or engines and or motors 350 to the gyroscopic fan 340. It should be understood that the gyroscopic fan 340 may be linked to the jet turbine and or engines and or motors 350 by one or more other ways other than described here, (such as e.g. a shaft drive, clutched or not, to a planetary gear box arrangement), and provision of a hub drive assembly as illustrated may not be necessary in some embodiments. In the preferred embodiment, the hub drive assembly 360 may comprises one or more mechanisms or the like to control the operation of the gyroscopic fan assembly 340. In other embodiments, the gyroscopic fan 340 may be a radial distal fan blade assembly, linked to the jet turbine and or engines and or motors 350 by electronic, hydraulic, pneumatic, actuators or other mechanical arrangements not previously mentioned. The aerial vehicle 300 has an upper fan which may provide down thrust in the direction to the centre of the aerial vehicle and a lower fan which provides upward thrust in a direction to the centre of the aerial vehicle and provides additional air pressure at the turbine intake increasing the efficiency by providing better compression ratios. Both the upper and lower fans can provide either upward thrust and or downward thrust relative to the top and bottom of aerial vehicle 300.

The aerial vehicle 300 is also adapted to be gyroscopically stabilised in a manner as has been previously described. The aerial vehicle 300 also comprises a ducted fuselage 345 that includes an opening in which the jet turbine and or engines and or motors 350 is positioned to provide a propulsion mechanism. The aerial vehicle 300 is provided with wing flaps 315A on the sides of the aerial vehicle 300 wings that are adapted to pivot about pivot points. The aerial vehicle 300 also comprises an articulated front wing 315B at the front of the aerial vehicle 300, that is adapted to pivot about pivot point 365 and provides pitch to the aerial vehicle and may include in combination to this a pivotally attached cockpit that enables 360-degree roll rotation of the cockpit relative to the aerial vehicle frame, the cockpit is adapted to pivot about pivot point 330A.

A controller 390 may also be provided for controlling the gyroscopic stabilisation arrangement via a gear box 385 such that angular momentum provided by the gyroscopic stabilisation arrangement (particularly the fan blades pitch and speed of rotation of the gyroscopic stabilisation fan assembly 340) is significantly larger than the moment of inertia of the aerial vehicle 300 so that the aerial vehicle 300 is substantially gyroscopically stabilised during flight.

The aerial vehicle 300 also includes a pivoting cockpit module 310 (which in this instant provides an ovoid shaped 'pod' enclosure, the shape of the cockpit may vary according to purpose) that is adapted to pivot along two different axes. Specifically, the cockpit module 310 is adapted to pivot about pivot point 330 A to allow the pivoting of the cockpit module 310 along a first axis (roll). The cockpit module 310 is also adapted to pivot about pivot point 330B to allow the cockpit module 310 and the front wing assembly to pivot about a second axis (pitch). The provision of the cockpit module 310 allows the aerial vehicle 300 to be operated by a pilot, or autonomously, during flight. The cockpit module 310 is connected to the aerial vehicle 300 by an ejector assembly 320 which is adapted to eject the cockpit module 310 from the rest of the aerial vehicle 300 and the cockpit becomes a self-contained pod.

The aerial vehicle 300 may also relate to the use of exhaust generated from a jet turbine 350 and the gyroscopic fan 340 to suppress a fire. The jet turbine 350 provides thrust to the aerial vehicle 300. During use, the engine air intake draws surrounding air and a combusted air fuel mixture is releases out of an outlet 355 through which a combusted air fuel mixture is exhausted at a high speed. An air flow directing assembly comprising an exhaust nozzle may be used for directing the combusted air fuel mixture from the outlet 355 in a desirable direction for suppressing fires. When crewed and or uncrewed, cargo, such as people, mail, food, liquids, solids, gasses and explosives can also be carried.

FIGS. 20 and 21 illustrate an embodiment of the present invention, providing an aerial vehicle 400 in which the body is annular with a torus (or 'doughnut') shaped aerial vehicle frame 445A and or fuselage 445B. A plurality of pivotally attached jet turbines and or engines and or motors 450 are mounted to the inner and or outer sides of the torus aerial vehicle frame 445A and or fuselage 445B, primarily for propulsion and or firefighting and/or lift purposes. The plurality of jet turbines and or engines and or motors 450 mounted to the sides of the torus aerial vehicle frame 445A and or fuselage 445B may be rotatable, enables 360-degree rotation, to enable VTOL capability and directing thrust in a desirable direction for suppressing fire. The jet turbines and or engines and or motors 450 can be mounted to an inner side of the torus aerial vehicle frame 445A and or fuselage 445B. A gyroscopic fan 440 is located in the centre of the torus fuselage 445B. Detail A shown in FIG. 5A and Detail B shown in FIG. 21 shows radial distal ends of the fan blades are pivotally attached, supporting pitch reversal, the gyroscopically fan may be powered from a central hub drive assembly 460, changing the thrust direction and speed of the fan, contained within an opening of the aerial vehicle frame 445A and or fuselage 445B. A cockpit module 410 may be located inside the torus aerial vehicle frame 445A and or fuselage 445B to allow provision of a pilot, the cabin of the aerial vehicle allows for crew and/or passengers. When crewed and or uncrewed, cargo such as mail, food, liquids, solids and gasses, can also be carried in the torus fuselage 445B. The aircraft described in FIG. 20 and FIG. 21 may be attached to another via the use of attachment points 495 located top and bottom of the fuselage 445B. as these are high stress points, are also attached to the aerial vehicle frame 445A.

The aerial vehicle 400 may have a pivotally detachable cabin and or cockpit module 410 inside the aerial vehicle frame and or fuselage and or cabin, this includes a counter-balancing arrangement 430 with a gimbal ring 425 at attachment points 435 to counterbalance the cockpit module 410 by countering the movement of the aerial vehicle frame 445A and or fuselage 445B and/or thrust of the one or more jet turbines and or engines and or motors 450 and or the rotation and torque of the jet turbines and or motors and or engines. The aerial vehicle 400 may also be an autonomous aerial vehicle without a cockpit. The gyroscopic fan 440 may be powered by one or more jet turbines and or engines and or motors 450 by electronic or other mechanical arrangements such as pneumatic, hydraulic via a central hub assembly. The gyroscopic fan 440 may be powered via the radial distal ends of the fan blade assembly (Detail A shown in FIG. 21), this may be driven by (for e.g. mechanically electrically, hydraulically, pneumatically) but is not limited to the power systems described here within.

Advantageously, the present invention provides a versatile aerial vehicle (100, 200, 300, 400) that has many useful and versatile flight characteristics including, for example, aerial vehicles with VTOL capabilities and gyroscopically stabilised flight between take off and landing, hover and hold and or firefighting purposes. As identified previously, one particular application of interest is in the fighting of forest fires such as bushfires and wildfires. However, such vehicles could also be used for transportation of cargo or rescue operations. Still further, embodiments of the aerial vehicle could be used to land on other planets provided they have a suitable atmosphere. The gyroscopic fan could also be replaced with a gyroscopic disc to provide stabilisation in space, where there is no atmosphere, in space craft and/or satellites.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An aerial vehicle comprising:
an elongated airframe;
at least one cockpit module detachably coupled to the elongated airframe;
at least one propulsion arrangement mounted to the elongated airframe and configured for providing thrust to the aerial vehicle;
a support structure coupled to the at least one propulsion arrangement and configured for controlling the direction of thrust of the at least one propulsion arrangement;
a gyroscopic stabilisation assembly including at least one rotatable gyroscopic member configured to be coupled to the at least one propulsion arrangement by a shaft assembly to gyroscopically stabilise the elongated airframe of the aerial vehicle in use;

wherein a longitudinal axis passes through the at least one cockpit module and extends longitudinally along the shaft assembly that drives the gyroscopic stabilisation assembly; and wherein the at least one cockpit module, the shaft assembly, and the gyroscopic stabilisation assembly are aligned centrally on the longitudinal axis.

2. The aerial vehicle of claim 1, wherein the at least one propulsion arrangement is pivotably mounted to the elongated airframe.

3. The aerial vehicle of claim 1, wherein the at least one rotatable gyroscopic member comprises a gyroscopic fan disposed within the elongated airframe, the gyroscopic fan including a plurality of fan blades, and wherein the pitch of at least one fan blade of the plurality of fan blades is adjustable.

4. The aerial vehicle of claim 1, wherein the aerial vehicle further comprises at least one controller for controlling operation of the aerial vehicle and the gyroscopic stabilisation assembly.

5. The aerial vehicle of claim 1, including a plurality of parallel gyroscopic members.

6. The aerial vehicle of claim 1, wherein the aerial vehicle includes attachment points for attaching the aerial vehicle to an adjacent similar aerial vehicle.

7. The aerial vehicle of claim 1, wherein the aerial vehicle is configured to operate:

(i) in a piloted mode with the at least one cockpit module attached to the elongated airframe; and (ii) in an autonomous mode or a remotely piloted mode with the at least one cockpit module detached from the elongated airframe.

8. The aerial vehicle of claim 1, wherein the at least one rotatable gyroscopic member includes one or more selected from:

a gyroscopic disc;

a central hub fan assembly; and a radial distal fan blade assembly.

9. The aerial vehicle of claim 1, wherein the detachable coupling of the at least one cockpit module to the elongated airframe is any one of:

(i) a fixed coupling configuration; and (ii) a pivoting coupling configuration.

10. The aerial vehicle of claim 1, wherein a cabin of the at least one cockpit module is pivotably coupled to the at least one cockpit module by a gimbal for rotation about at least two axes.

11. The aerial vehicle of claim 1, wherein the at least one propulsion arrangement is fixedly mounted to the elongated airframe.

12. The aerial vehicle of claim 1, wherein the at least one propulsion arrangement includes an airflow directing assembly for directing thrust from the at least one propulsion arrangement in a plurality of directions.

13. The aerial vehicle of claim 1, wherein the at least one propulsion arrangement is mounted to the elongated airframe:

(i) centrally within the elongated airframe;

(ii) externally of the elongated airframe; or (iii) both centrally within the elongated airframe and externally of the elongated airframe.

14. The aerial vehicle of claim 1, wherein the at least one propulsion arrangement rotates about an axis of rotation and the gyroscopic member rotates about an axis of rotation, and the at least one propulsion arrangement and the gyroscopic member are arranged such that their respective axes of rotation are substantially parallel to each other.

15. The aerial vehicle of claim 14, wherein the axes of the at least one propulsion arrangement and the gyroscopic fan are arranged substantially longitudinally in the airframe.

16. A method of suppressing a fire, the method comprising the steps of: providing an aerial vehicle as claimed in claim 1;

moving the aerial vehicle to a location in the vicinity of the fire using the at least one propulsion arrangement;

locating the aerial vehicle above the fire with the at least one propulsion arrangement directing its thrust towards the fire;

operating the gyroscopic stabilisation arrangement to gyroscopically stabilise the elongated airframe of the aerial vehicle; and controlling the at least one rotatable gyroscopic member to manage the thrust of the at least one propulsion arrangement.

17. The method of claim 16, wherein the method includes:

controlling the support structure to move about at least two axes to direct the thrust generated by the at least one propulsion arrangement towards the fire while maintaining the orientation of the elongated airframe.

18. The method of claim 16, wherein controlling the at least one rotatable gyroscopic member further comprises:

controlling a gyroscopic fan having a plurality of fan blades with adjustable pitch; and adjusting the pitch of the fan blades selectively thereby controlling the vertical position of the aerial vehicle while directing thrust toward the fire.

19. The method of claim 18, wherein adjusting the pitch of the fan blades further comprises adjusting the pitch selectively between:

(i) a first pitch configuration in which the fan blades generate thrust in a first axial direction to supplement thrust generated by the at least one propulsion arrangement; and (ii) a second pitch configuration in which the fan blades generate thrust in a second axial direction opposite to the first axial direction to counteract upward aerodynamic forces acting on the aerial vehicle.

* * * * *